United States Patent
Yamagajo et al.

(10) Patent No.: US 8,068,057 B2
(45) Date of Patent: Nov. 29, 2011

(54) RFID TAG

(75) Inventors: Takashi Yamagajo, Kawasaki (JP); Toru Maniwa, Kawasaki (JP); Manabu Kai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 647 days.

(21) Appl. No.: 12/000,252

(22) Filed: Dec. 11, 2007

(65) Prior Publication Data

US 2008/0180328 A1    Jul. 31, 2008

(30) Foreign Application Priority Data

Jan. 31, 2007   (JP) ................. 2007-020902

(51) Int. Cl.
*H01Q 1/38* (2006.01)

(52) U.S. Cl. ............... 343/700 MS; 340/572.7

(58) Field of Classification Search ........... 343/700 MS; 340/572.7
See application file for complete search history.

(56) References Cited

U.S. PATENT DOCUMENTS

| 6,140,968 | A * | 10/2000 | Kawahata et al. ..... 343/700 MS |
| 6,215,402 | B1 | 4/2001 | Rao Kodukula et al. |
| 6,975,834 | B1 * | 12/2005 | Forster ..................... 455/277.2 |
| 7,557,757 | B2 * | 7/2009 | Deavours et al. ...... 343/700 MS |
| 2004/0004571 | A1 | 1/2004 | Adachi et al. |
| 2005/0275591 | A1 | 12/2005 | King et al. |
| 2007/0200711 | A1 | 8/2007 | Kai et al. |

FOREIGN PATENT DOCUMENTS

| EP | 0 079 047 A | 5/1983 |
| GB | 2 370 158 A | 6/2002 |
| JP | 10-70411 | 3/1998 |
| JP | 2001036332 | 2/2001 |
| JP | 2003008342 | 1/2003 |
| JP | 20047559 | 1/2004 |
| JP | 2004295297 | 10/2004 |
| JP | 2006033298 | 2/2006 |
| JP | 2006311239 | 11/2006 |
| JP | 4498364 | 4/2010 |
| WO | WO 02/07255 | 1/2002 |
| WO | WO 02/29929 A2 | 4/2002 |
| WO | WO 2005 031983 A2 | 4/2005 |

OTHER PUBLICATIONS

Luk K. M. et al., "Wideband L-probe-feed patch antenna with dual-band operation for GSM/PCS base stations"; Electronics Letters, IEE Stevenage, GB vol. 35, No. 14, dated Jul. 8, 1999, pp. 1123-1124, XP005012395.

Hoorfar A. et al., "Dual frequency circularly-polarised proximity-fed microstrip antenna"; Electronics Letters, IEE Stevenage, GB, vol. 35, No. 10, dated May 13, 1999, pp. 759-761, XP006012160.

Extended European Search Report; Application No. 07123464.5 dated May 20, 2008.

Japanese Notification of Reason for Refusal dated Mar. 8, 2011 for application No. 2007-020902.

Notification of Reasons for Refusal dated Jul. 26, 2011, received in patent application No. 2007-020902.

* cited by examiner

*Primary Examiner* — Douglas W Owens
*Assistant Examiner* — Dieu Hien T Duong
(74) *Attorney, Agent, or Firm* — Murphy & King, P.C.

(57) ABSTRACT

An RFID tag that has a tag antenna and a tag LSI comprising: a power-supply element in which the tag LSI is mounted on a power-supply section; a plurality of patch antennas that function as tag antennas and sizes differs; and a high-frequency coupling section that couples the power-supply element with each of the patch antennas by high-frequency coupling.

3 Claims, 18 Drawing Sheets

| PARAMETER | S0 | S1 | L0 | L1 | L2 |
|---|---|---|---|---|---|
| VALUE (mm) | 26 | 32 | 82 | 79 | 75 |

| PARAMETER | S0 | S1 | S2 | S3 | S4 | L1 | L2 | W |
|---|---|---|---|---|---|---|---|---|
| VALUE (mm) | 10 | 10 | 20 | 9 | 6 | 77.5 | 74 | 50 |

FIG. 11A
FIG. 11B
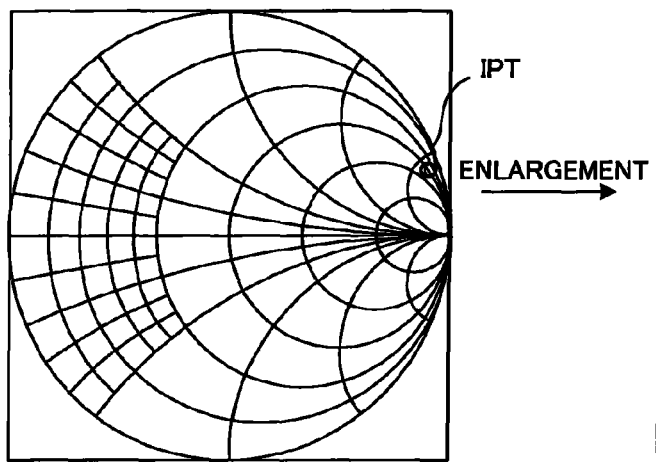
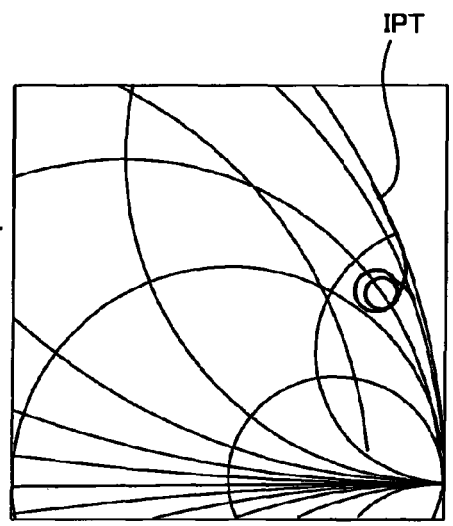
FIG. 12
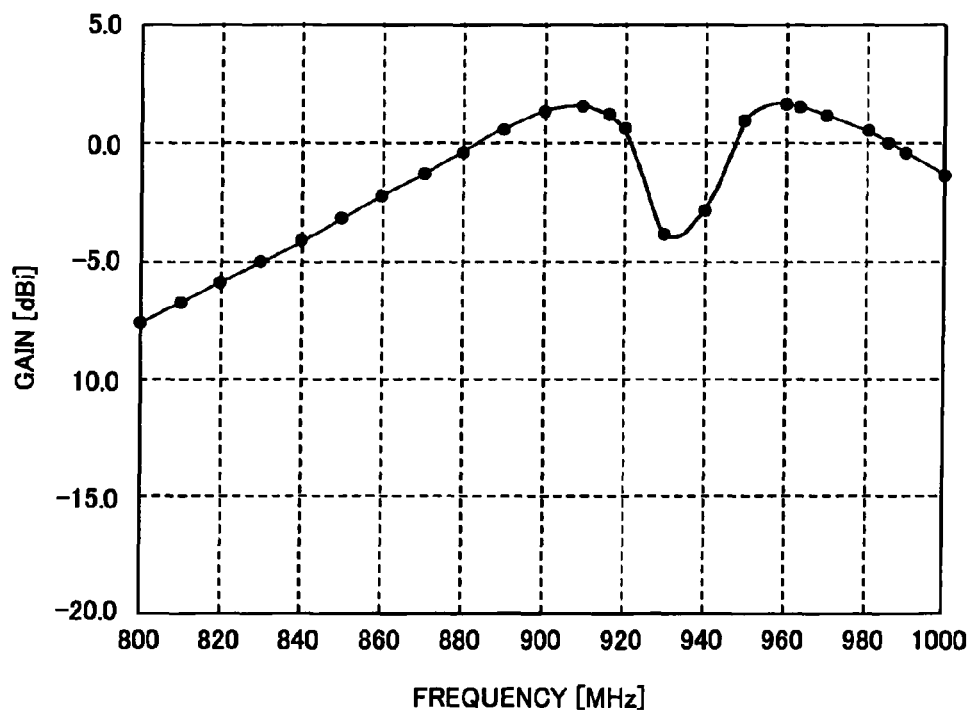

S3=7mm

S3=37mm

RFID TAG

BACKGROUND OF THE INVENTION

This invention relates to an RFID tag that comprises an antenna and tag LSI, and more particularly to an RFID tag having a plurality of patch antennas of different sizes as tag antennas so that the RFID tag can be utilized in a plurality of areas using different transmission frequencies.

Conventionally, in the distribution industry, transportation industry and the like, one method that is widely used as a method of controlling and managing various kinds of product information, is a method in which barcodes are printed onto or stuck on a product itself or to the product box, and this barcode is read by a barcode reader. However, in the method of processing barcodes, the barcode reader must come in contact with the barcode, so the work of reading the barcodes is somewhat troublesome. Also, in a conventional barcode processing method there is a problem in that it is not possible to add or update new information to the barcode itself. Therefore, in recent years, instead of barcodes, a method of attaching RFID (Radio Frequency Identification) tags to products and the like, and reading the product information without contact by radio communication (electromagnetic coupling) is being demanded and also being put into practice. In an RFID tag, a radio communication function for transmitting information has been added to the function of an IC card, and comprises a nonvolatile memory that is capable of storing information, and does not have a battery (power supply section). Therefore, when a tag reading device reads information from the memory of the RFID tag without contact, it supplies power to the RFID tag by electromagnetic waves, and reads the information from the memory. By using an RFID tag, workability can be greatly improved, and by using technology such as a verification function and cipher function, it is possible to maintain excellent security.

FIG. 21 is a drawing explaining an RFID tag, where a reading device 1 sends a radio signal (electromagnetic wave) that is modulated with transmission data to the RFID tag 3 from an antenna 2. The antenna 3a of the RFID tag 3 inputs the received signal to a rectifying circuit 3b and modulation/demodulation circuit 3c. The rectifying circuit 3b converts the radio signal to a DC voltage and supplies the DC voltage to the modulation/demodulation circuit 3c and a logic circuit 32d, which acts as a power supply. The modulation/demodulation section 3c demodulates the control data that was sent from the reading device 1 and inputs the result to the logic circuit 3d. The logic circuit 3d performs logical processing according to the control data (commands); for example, it reads the information stored in the internal memory and inputs it to the demodulation/modulation circuit 3c. The modulation/demodulation circuit 3c uses the information that is input from the logic circuit 3d to modulate a carrier wave, and transmits that carrier wave to the reading device 1 from the antenna 3a.

Various types of RFID tags have been proposed. As one of these, the inventors of this invention have proposed a UHF band RFID tag that comprises: a power-supply pattern section on which a tag LSI is mounted, a patch antenna that functions as a tag antenna, and a high-frequency coupling section that performs high-frequency coupling between the power-supply pattern section and patch antenna (refer to Japanese patent application 2006-216727). With this UHF RFID tag, the communication distance does not become poor even when the tag is stuck on a metal or liquid object, and it is not necessary to open holes up in the patch antenna for supplying power or to use an impedance conversion circuit, so this tag has the advantage that it can be made small and thin, however, there is a problem in that the frequency band is narrow, and the gain quickly becomes poor when the frequency shifts from the resonant frequency of the patch antenna. By reason of the narrow frequency band and poor gain characteristic, it is impossible to use the proposed UHF band RFID tag in a case where a wide frequency band is demanded. In other words, the transmission frequency differs according to country, for example, in Japan the transmission frequency used is 952 to 954 MHz, in the USA the transmission frequency used is 902 to 928 MHz, and in Europe the transmission frequency used is 869.4 to 869.65 MHz, so a RFID tag having a narrow frequency as described above cannot be applied to products or parts that are to be used in a plurality of countries to manage product information.

As prior art, there is a multi-band RFID tag that can be used in a plurality of frequencies (refer to Japanese patent application JP10-70411A). As shown in (A) of FIG. 22, this RFID tag comprises construction in which one H-type patch antenna 5 is replaced by a plurality of line elements 6 as shown in (B) of FIG. 22, where by changing the length of the line elements 6a, 6b, the tag is capable of corresponding to a plurality of frequencies (7.8 GHz, 10.8 GHz) as shown in (C) of FIG. 22. However, with the RFID tag of this prior art, it is necessary that the frequencies be sufficiently separated from each other, and there is a problem in that the tag cannot be used when the frequencies are relatively close. In other words, in the case of the frequencies used in Japan, the USA and Europe, where the frequencies are relatively close, the tag cannot be used.

SUMMARY OF THE INVENTION

Therefore, the object of the present invention is to provide a RFID tag having a wide frequency bandwidth.

Another object of the present invention is to provide a RFID tag that can be utilized in a plurality of areas using different transmission frequencies.

A further object of the present invention is to provide a RFID tag that can be utilized even when the transmission frequencies used in plural areas are relatively close.

The present invention is an RFID tag that has a tag antenna and a tag LSI, comprising: a power-supply element in which the tag LSI is mounted on a power-supply pattern section; a plurality of patch antennas that function as tag antennas and sizes differ; and a high-frequency coupling section that couples the power-supply element with each of the patch antennas by high-frequency coupling.

The power-supply pattern section comprises a loop pattern, and the high-frequency coupling section couples the loop pattern with each of the patch antennas by high-frequency coupling, or the power-supply pattern section comprises a linear antenna pattern, and the high-frequency coupling section couples the linear antenna pattern with each of the patch antennas by high-frequency coupling, or the power-supply pattern section comprises a pattern that is a combination of a loop pattern and linear antenna pattern, and the high-frequency coupling section couples the loop pattern or linear antenna pattern with each of the patch antennas by high-frequency coupling.

With this invention, the RFID tag comprises a plurality of patch antennas that function as tag antennas and that have different sizes, so it is possible to increase the frequency bandwidth, as well as increase the gain of the transmission frequency used for RFID tags for Japan, the USA and Europe, and to provide a RFID tag that can be used in a plurality of regions (Japan, USA, Europe) that use these different transmission frequencies.

With this invention, the power-supply pattern section and patch antennas are coupled by a high-frequency coupling, so it is not necessary to form holes in the patch antennas in order to supply power, and thus the construction of the power-supply section is simplified.

With this invention, by adjusting the length of the loop pattern or linear antenna (monopole pattern), or by adjusting the length and the relative position between the pattern and patch antennas, it is possible to adjust the impedance matching between the tag antenna and tag LSI. Therefore, there is no need for an impedance conversion circuit, and it is possible to make the RFID tag smaller and thinner.

With this invention, the size of the RFID tag can be reduced by cutting away part of the patch antennas to form a H-shaped patch or C-shaped patch. Moreover, with this invention, it is possible to receive and emit circular polarized waves by cutting away diagonally the corner sections of the patch antennas, or by forming a diagonal slit in the patch antennas.

Other features and advantages of the present invention will be apparent from the following description taken in conjunction with the accompanying drawings.

BRIEF DESCRIPTION OF THE DRAWINGS

FIG. 11A and FIG. 11B are Smith charts showing the impedance of a tag antenna of a second embodiment of the invention.

FIG. 12 is a drawing showing the gain of a RFID tag of a second embodiment of the invention when the frequency is changed from 800 MHz to 1000 MHz.

DESCRIPTION OF THE PREFERRED EMBODIMENTS (A) Embodiment 1

(a) Construction

Figure 1A:
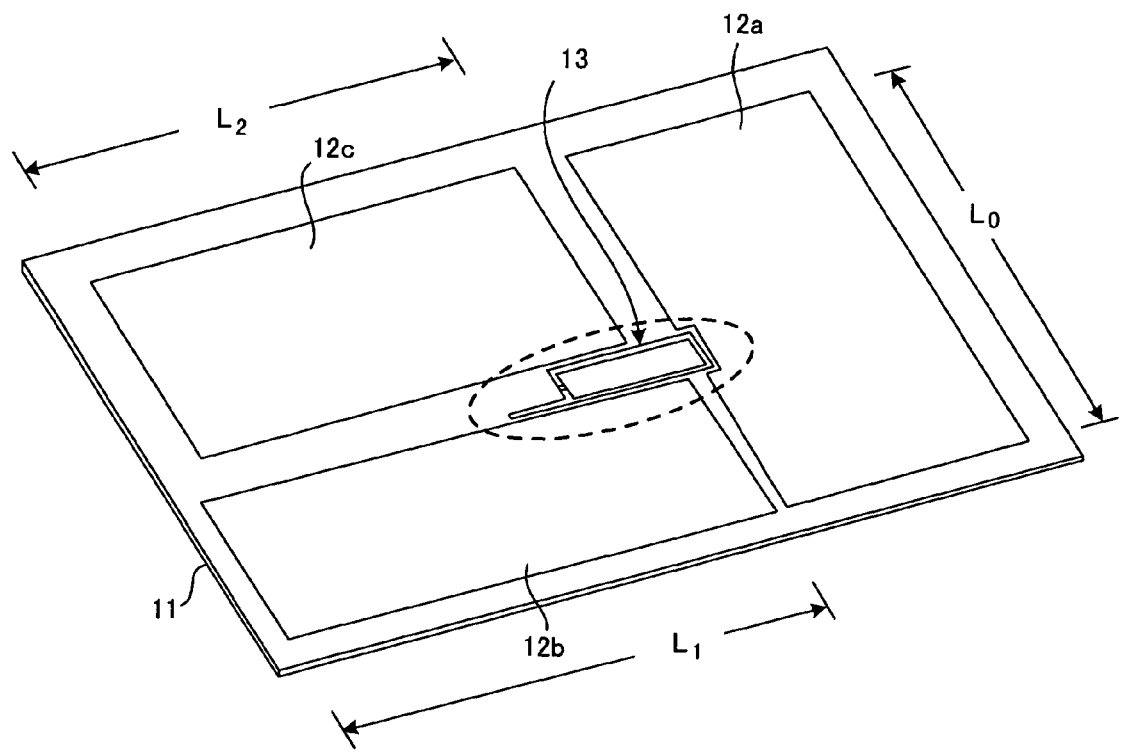
FIG. 1A and FIG. 1B are drawings explaining the RFID tag of a first embodiment of the invention.
Figure 1B:
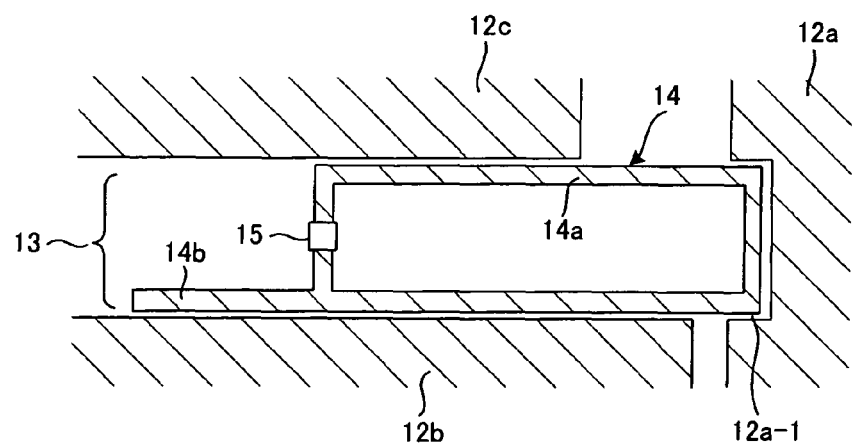

FIGS. 1A and 1B are drawings explaining a RFID tag of a first embodiment of the invention, where FIG. 1A is a pictorial drawing and FIG. 1B is an enlarged view of a part enclosed by a dotted line in FIG. 1A.

The RFID tag of this first embodiment is made by etching the rear surface of a double-sided printed circuit board 11 to form three patch antennas 12a to 12c, which function as a tag antenna, and a power-supply pattern section 14, and then mounting a tag LSI 15 on that power-supply pattern section 14 using a chip bonding technique. The power-supply pattern section 14 and the tag LSI 15 form a power-supply element 13. An electrically conductive pattern (not shown in the figure) on the rear surface of the printed circuit board 11 is used as a ground (all surfaces are metallic).

The sizes L0 to L2 of the patch antennas 12a to 12c are set so that the resonant frequencies will correspond with the transmission frequencies used by UHF band RFID tags in Europe, the USA and Japan. The power-supply pattern section 14 comprises a loop pattern 14a and a monopole pattern 14b that functions as a small monopole antenna, and these patterns are coupled with the patch antennas 12a to 12c by high-frequency coupling, and through this high-frequency coupling, signals are input to each of the patch antennas from the tag LSI 15, or signals that are received by each of the patch antennas are input to the tag LSI 15 via each pattern. The small monopole antenna means a monopole antenna that has a wavelength that is very short compared to the wavelength λ, and here it is referred to as a monopole pattern or monopole antenna pattern.

There is a shallow cutout section 12a-1 formed on the end section of the right side of the patch antenna 12a, and part of a loop pattern 14a is placed in this cutout section, and the loop pattern 14a and patch antenna 12a are connected by high frequency by way of this cutout section. In other words, power is supplied from the loop pattern 14a to the patch antenna 12a by high frequency. Part of the loop pattern 14a and the monopole pattern 14b are placed in a linear shape so that they are parallel with the patch antenna 12b with a specified amount of space between them, and the loop pattern 14a and the monopole pattern 14b are connected with the patch antenna 12b by high frequency so that power is supplied to the patch antenna 12b by high frequency. Also, a part of the loop pattern 14a is placed parallel with the patch antenna 12c with a specified amount of space between them, and the loop pattern 14a and patch antenna 12c are connected by high frequency so that power is supplied to the patch antenna 12c by high frequency. There are no cutout sections formed in the patch antenna 12b and patch antenna 12c, however construction could be such that cutout sections are similarly formed as in the case of patch antenna 12a and that part of the loop pattern 14a and the monopole pattern 14b are placed in those cutout sections.

Figure 2A:
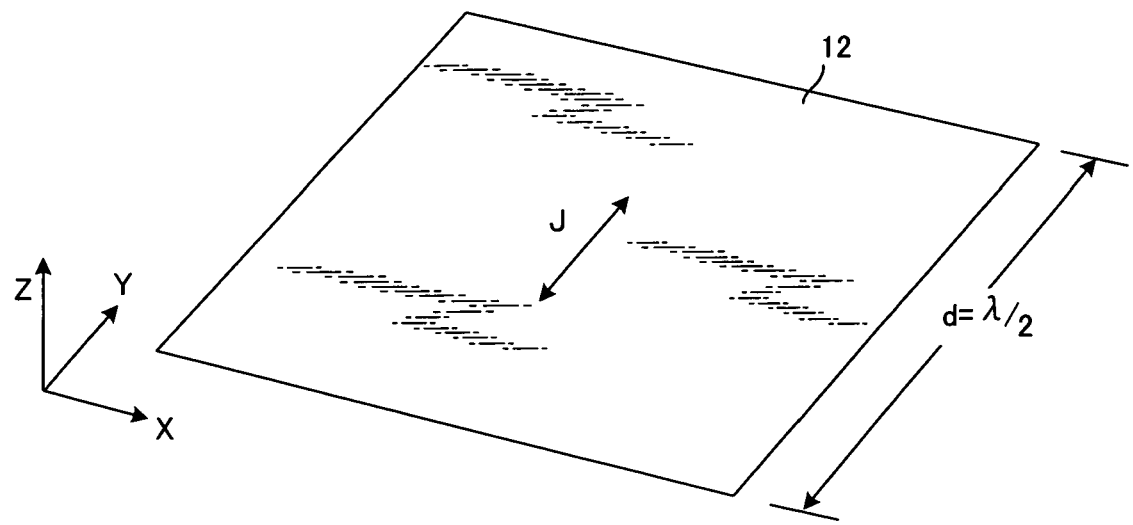
FIG. 2A and FIG. 2B are drawings explaining the reception and emission fundamentals of a patch antenna.
Figure 2B:

As shown in FIG. 2A, the electrical length of one side of the patch antenna 12 of the RFID tag is made to be $\lambda/2$, and that patch antenna is caused to resonate at a specified frequency, or in other words, a current J flows back and forth over the surface of the patch antenna. By doing so, an electromagnetic wave having a polarized wave in the Y-axis (horizontal) direction is emitted in the vertical direction (Z-axis direction) to the patch antenna as shown in FIG. 2B. This electromagnetic wave is not affected by the material characteristics on the ground side of the patch antenna. As a result, when the sizes L0 to L2 of each of the patch antennas 12a to 12c are determined so that resonant frequencies of the patch antennas 12a to 12c correspond with the transmission frequencies used for UHF band RFID tags in Europe, the USA and Japan, the gain of the RFID tag increases at the resonant frequency.

Figures 3A, 3B:
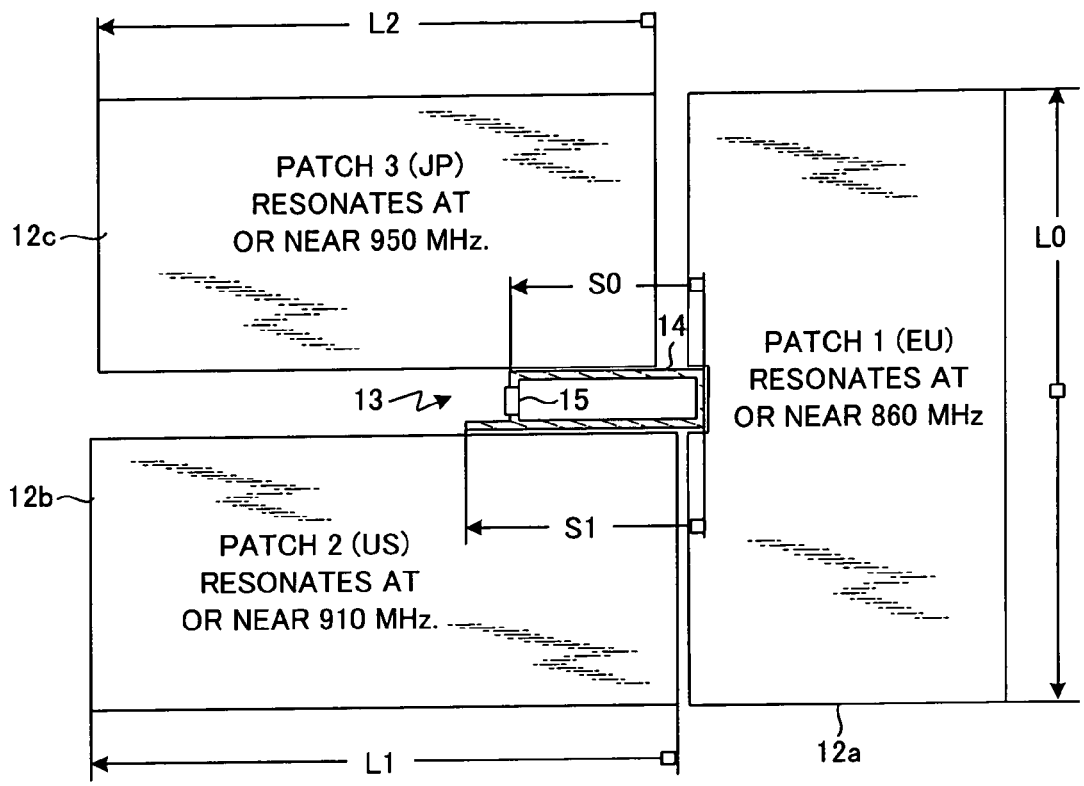
FIG. 3A and FIG. 3B are drawings showing an example of dimensions of an RFID tag of a first embodiment of the invention.

FIGS. 3A and 3B show the actual dimensions of the RFID tag of FIG. 1, where the length of the side of the loop pattern is 26 mm and the length (S1-S0) of the monopole pattern is 6 mm, or in other words S1=32 mm. Also, the sizes L0 to L2 of one of the edges of the patch antennas 12a to 12c are 82 mm, 79 mm and 75 mm, respectively, and are such that they resonate at or near the frequencies 860 MHz, 910 MHz and 950 MHz, respectively. The board characteristics, or in other words, the dielectric characteristics are: specific dielectric constant=4.5, dielectric loss=0.009, and the board thickness is taken to be 1.2 mm.

(b) Characteristics

Various characteristics were simulated for a RFID tag having the dimensions shown in FIG. 3A and FIG. 3B and the board characteristics described above, when the frequency applied to the patch antenna was changed from 820 MHz to 1000 MHz.

Matching Characteristics

Figure 4B:
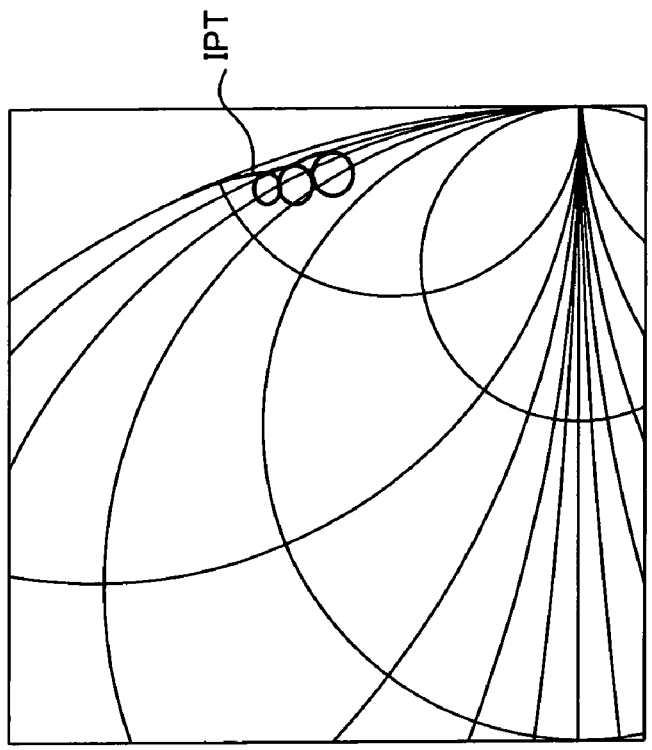
FIG. 4A and FIG. 4B are Smith charts that show the impedance of a tag antenna of a first embodiment of the invention.
Figure 4A:
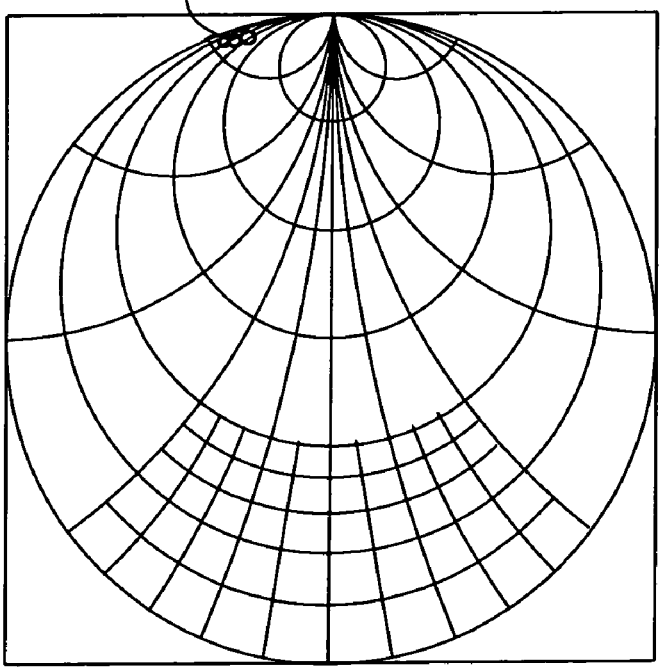

FIG. 4A is a Smith chart showing the impedance of a tag antenna, and FIG. 4B is a partial enlarged view. When the frequency is changed from 820 MHz to 1000 MHz, the impedance of the tag antenna changes in a circular pattern as shown by IPT, however, it can be seen that the impedance does not change greatly. This means it is easy to match the impedances of the tag LSI and tag antenna over a wide bandwidth.

Figure 5:
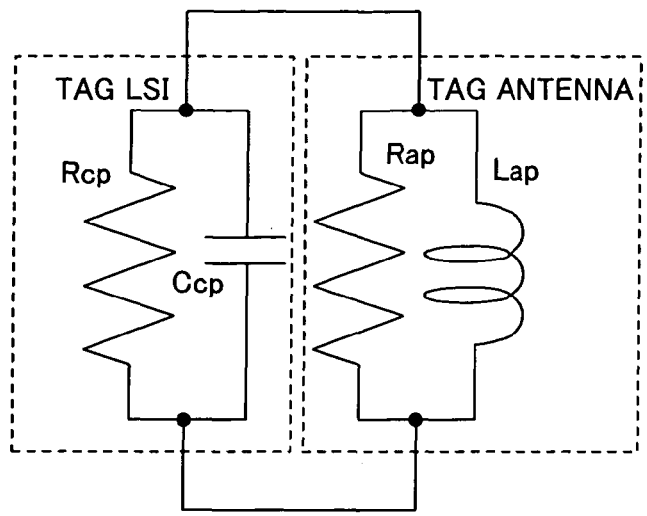
FIG. 5 is an equivalent circuit of a RFID tag that comprises a tag LSI and tag antenna.

FIG. 5 shows an equivalent circuit of a RFID tag that is constructed of a tag LSI and tag antenna. The equivalent circuit is expressed by a parallel circuit comprising a tag LSI and tag antenna, where the tag LSI is expressed by a parallel circuit comprising a resistance Rcp ($\Omega$) and capacitance Ccp (pF), and the tag antenna is expressed by a parallel circuit comprising a resistance Rap ($\Omega$) and inductance Lap (H). The reactance Xc of the tag LSI is $1/j\omega Ccp$ and the reactance Xa of the tag antenna is $j\omega L$, where the matching conditions for the RFID tag are Rc=Ra, and |Xc|=|Xa|.

Gain Characteristics

Figure 6:
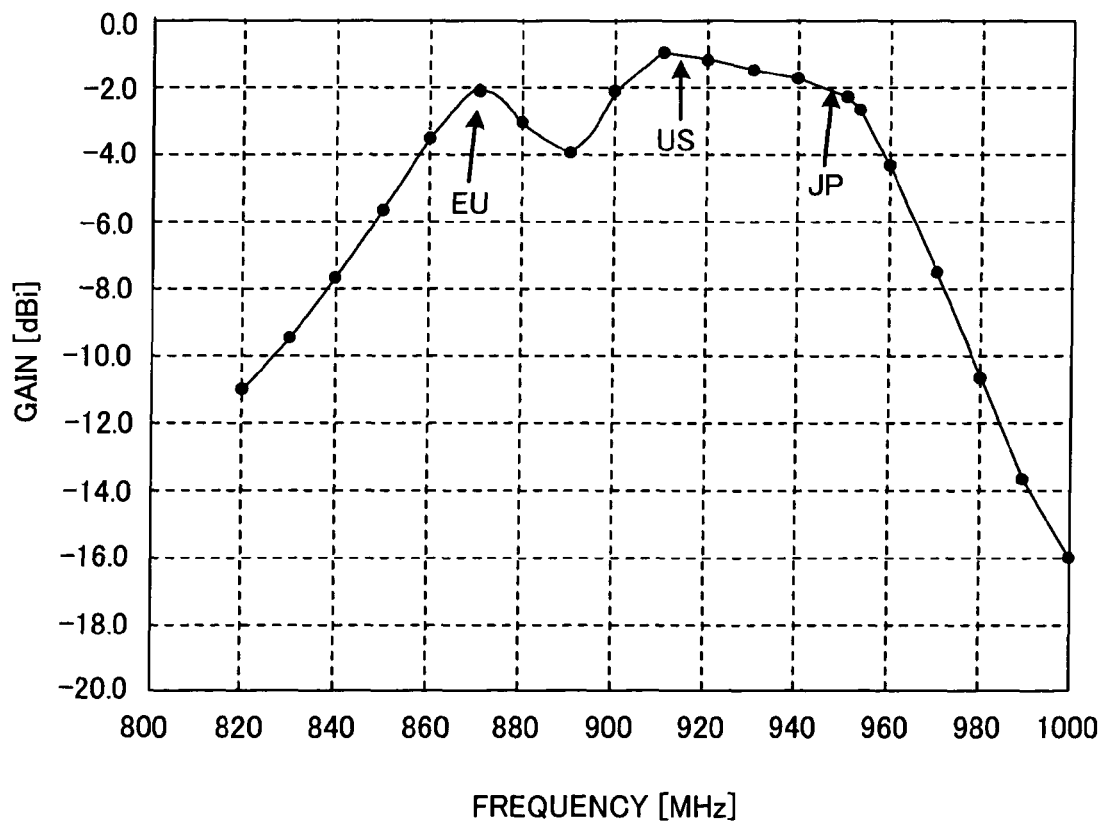
FIG. 6 is a drawing showing the gain of a tag antenna of a first embodiment of the invention when the frequency is changed from 820 MHz to 1000 MHz.

FIG. 6 shows the gain of the tag antenna when the frequency is changed from 820 MHz to 1000 MHz. In the figure, EU is the gain at transmission frequencies (869.4 to 869.65 MHz) that are used for a RFID tag in Europe, US is the gain at transmission frequencies (902 to 928 MHz) that are used for a RFID tag in the USA, and JP is the gain at transmission frequencies (952 to 954 MHz) that are used for a RFID tag in Japan, and it can be seen that the gains in the frequency bandwidths used in Japan, the USA and Europe are high.

S11 Characteristics and Communication Distance

As shown in Table 1, the S11 characteristics and communication distance are simulated with the minimum necessary power for operating the tag LSI taken to be −7.00 dBm, the resistance Rcp of the tag LSI taken to be 2000.0$\Omega$, the capacitance Ccp taken to be 0.55 pF, the power supplied to the antenna of the reader/writer taken to be 27.00 dBm, and the reader/writer antenna gain taken to be 9.00 dBi.

TABLE 1

| LSI | MINIMUM NECESSARY POWER | −7.00 dBm |
|---|---|---|
|  | Rcp | 2000.00 $\Omega$ |
|  | Ccp | 0.55 pF |
| RW | POWER | 27.00 dBm |
|  | GAIN | 9.00 dBi |

Figure 7:
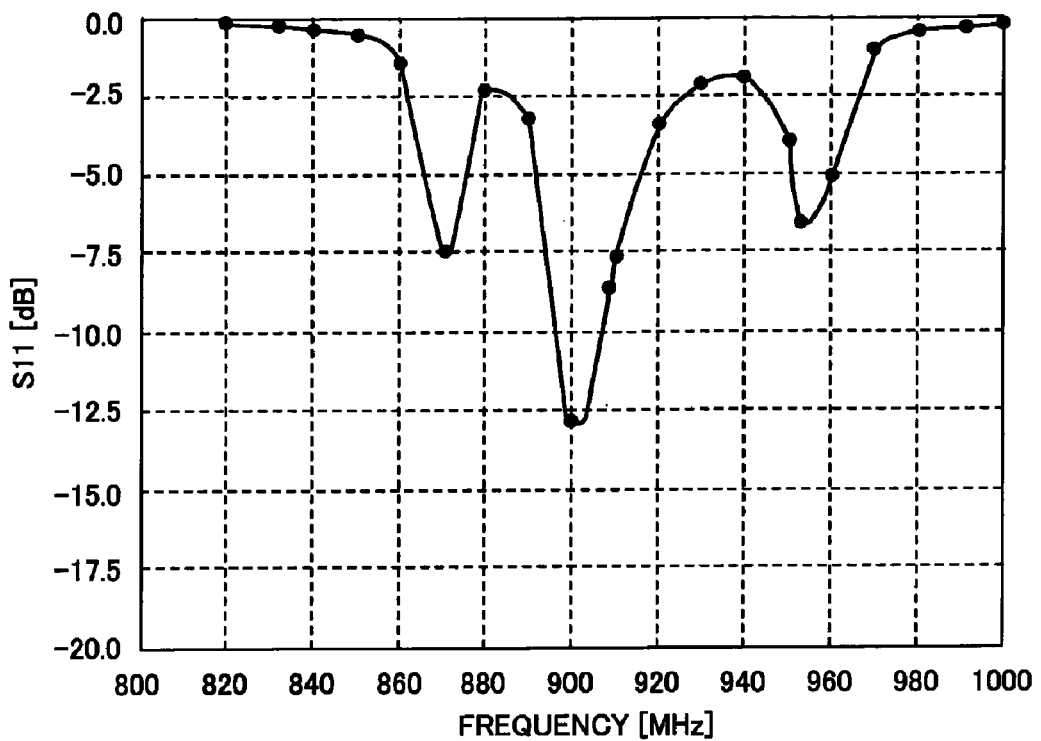
FIG. 7 is a drawing showing the simulation results for the S parameter S11 of a first embodiment of the invention when the frequency is changed from 820 MHz to 1000 MHz.

FIG. 7 shows the simulation results of the S parameter S11 when the frequency is changed from 820 MHz to 1000 MHz. The S parameter S11 expresses the degree of impedance matching between the tag LSI and tag antenna, with the reference impedance being the impedance of the tag LSI and not 50$\Omega$. From FIG. 7, it can be seen that matching is achieved for the transmission frequency bandwidths used for the three RFID tags for Japan, the USA and Europe.

Figure 8:
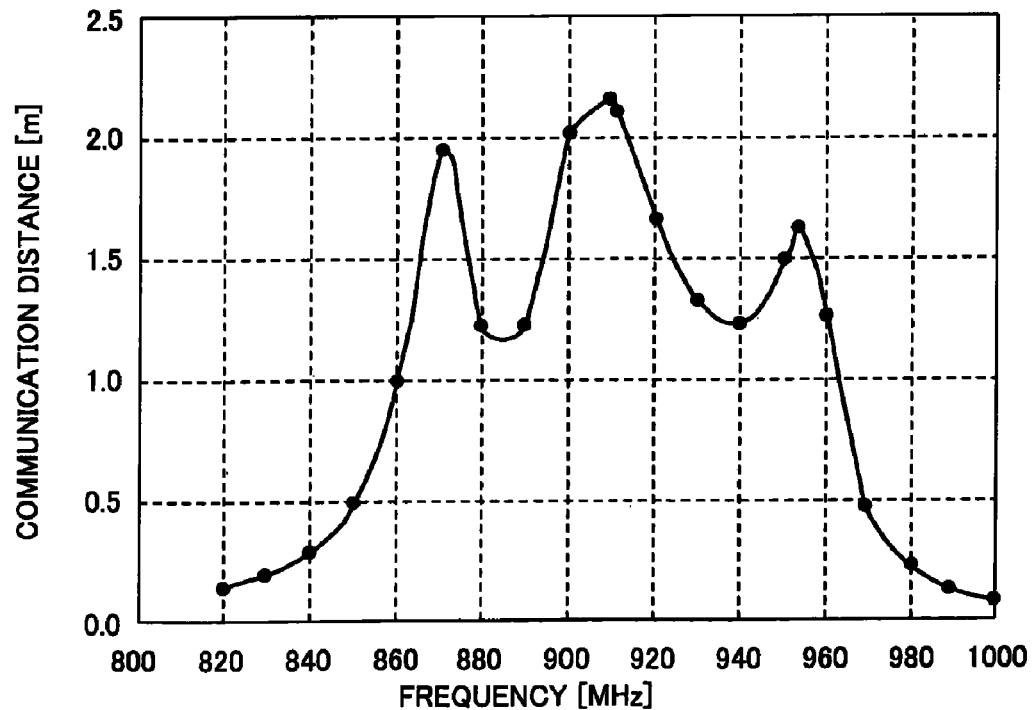
FIG. 8 is a drawing showing the communication distance of a first embodiment of the invention when the frequency is changed from 820 MHz to 1000 MHz.

FIG. 8 shows the communication distance when the frequency is changed from 820 MHz to 1000 MHz for the case in which a linear polarized antenna is used for the antenna of the reader/writer, and from the figure it can be seen that communication distance can be increased in the transmission frequency bandwidths used for the three RFID tags for Japan, the USA and Europe. The communication distance r for the RFID tag is given by the equation below.

$$r = \frac{\lambda}{4\pi}\sqrt{\frac{Pt \cdot Gt \cdot Gr \cdot q}{Pth}} \quad (1)$$

$$q = \frac{4Rc \cdot Ra}{|Zc + Za|^2}$$

Here, $\lambda$ is the wavelength, Pt is the power that is applied to the reader/writer antenna, Gt is the antenna gain of the reader/writer antenna, Gr is the antenna gain of the tag antenna, q is the matching coefficient, and Pth is the minimum required power for the tag LSI to operate. Also, Zc and Za are the complex impedance of the tag LSI and tag antenna, respectively, and are expressed as Zc=Rcp+j·Xc and Za=Rap+j·Xa.

Matching Adjustment

There are cases in which impedances of the tag antenna and tag LSI cannot be matched. In such a case, the impedances of the tag antenna and tag LSI can be matched by adjusting the length of the loop pattern or monopole pattern, or by adjusting the relative position between patch antennas. The method for performing matching adjustment will be described in detail in the second embodiment.

(c) Effect

With this first embodiment, the RFID tag comprises a plurality of patch antennas that function as tag antennas and that have different sizes, so it is possible to increase the frequencies bandwidth, as well as increase the gains at the transmission frequency used for RFID tags for Japan, the USA and Europe, and to provide a RFID tag that can be used in a plurality of regions (Japan, USA, Europe) that use these different transmission frequencies. Also, with this first embodiment, the power-supply pattern section and patch antennas are coupled by a high-frequency coupling, so it is not necessary to form holes in the patch antennas in order to supply power, and thus the construction of the power-supply section is simplified.

Also, with this first embodiment, by adjusting the length of the loop pattern or linear antenna (monopole pattern), or by adjusting the length and the relative position between the patch antennas, it is possible to adjust the impedance matching between the tag antenna and tag LSI. Therefore, there is no need for an impedance conversion circuit, and it is possible to make the RFID tag smaller and thinner.

(B) Embodiment 2

(a) Construction

Figure 9A:
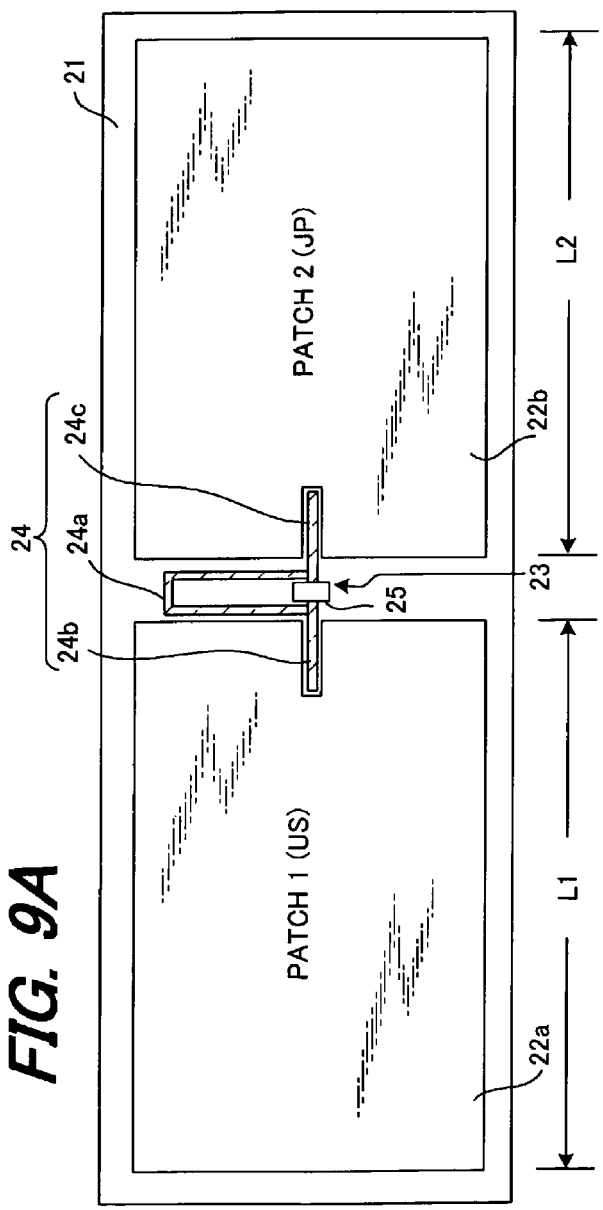
FIG. 9A and FIG. 9B are drawings explaining a RFID tag of a second embodiment of the invention.
Figure 9B:
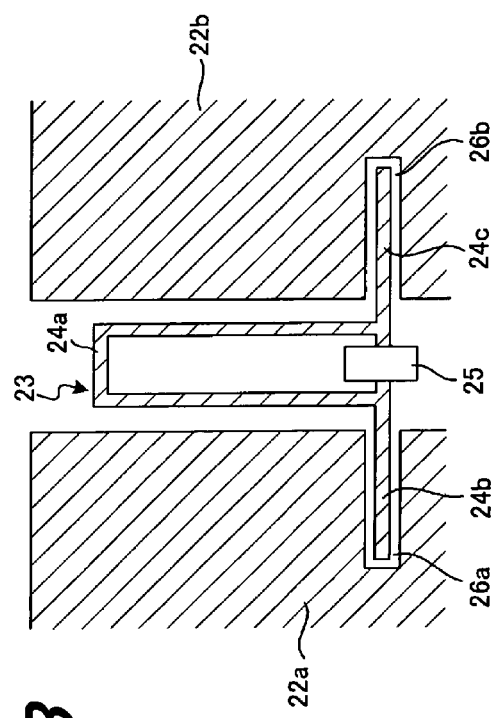

FIGS. 9A and 9B are drawings explaining the RFID tag of a second embodiment of the invention, where FIG. 9A is a top view, and FIG. 9B is an enlarged view of the main part.

The RFID tag of this second embodiment is made by etching the surface of a double-sided printed circuit board 21 to form two patch antennas 22a to 22b, which function as tag antennas, and a power-supply pattern section 24, and by mounting a tag LSI 25 onto the power-supply pattern section 24 by a chip bonding technique. The power-supply pattern section 24 and tag LSI 25 form a power-supply element 23. The electrically conductive pattern (not shown in the figure) on the rear surface of the printed circuit board is used as a ground (all surfaces are metallic).

The sizes L1 to L2 of the patch antennas 22a to 22b are set so that the resonant frequencies correspond with the transmission frequencies used by UHF RFID tags for the USA and Japan. The power-supply pattern section 24 comprises a loop pattern 24a, and dipole patterns 24b, 24c that function as a small dipole antenna, where the dipole patterns 24b, 24c are coupled with the patch antennas 22a to 22b by high-frequency coupling, and signals are input from the tag LSI 25 to the patch antennas by way of this high-frequency coupling, or signals that are received by the patch antennas are transferred to the patterns and input to the tag LSI 25. A small dipole antenna is a dipole antenna having a length that is much shorter than the wavelength λ, and here it is referred to as a dipole pattern or dipole antenna pattern. A dipole antenna and monopole antenna are kinds of linear antennas.

Long, thin cutout sections 26a, 26b are formed in the center of the end sections of the patch antennas 22a to 22b, and the dipole patterns 24b, 24c are located inside those cutout sections. A loop pattern (parallel inductor) 24a for adjusting the impedance is formed above the dipole patterns, and is integrated with the dipole patterns, the length of which is adjusted (as will be explained later) in order to match the impedance of the tag antenna with the impedance of the LSI chip 25. The dipole patterns 24b, 24c are placed in the long, thin cutout sections 26a, 26b that are formed in the patch antennas 22a to 22b, and they supply power by high frequency to the patch antennas 22a to 22b by way of the cutout sections.

The electrical length of one side of the patch antennas of the RFID tag is λ/2, and the patch antennas resonate at a specified frequency that corresponds to that size, in other words, when a current J flows back and forth over the surface of the patch antenna, an electromagnetic wave that is polarized in the direction of the Y-axis (horizontal direction) is emitted in the vertical direction (Z-axis direction) to the patch antennas as explained using FIG. 2. When the sizes L1 to L2 are set so that the resonant frequencies of the patch antennas 22a, 22b shown in FIG. 9A and FIG. 9B correspond to the transmission frequencies for UHF RFID tags that are used in Japan and the USA, the gain of the RFID tag increases at those resonant frequencies.

Figures 10A, 10B:
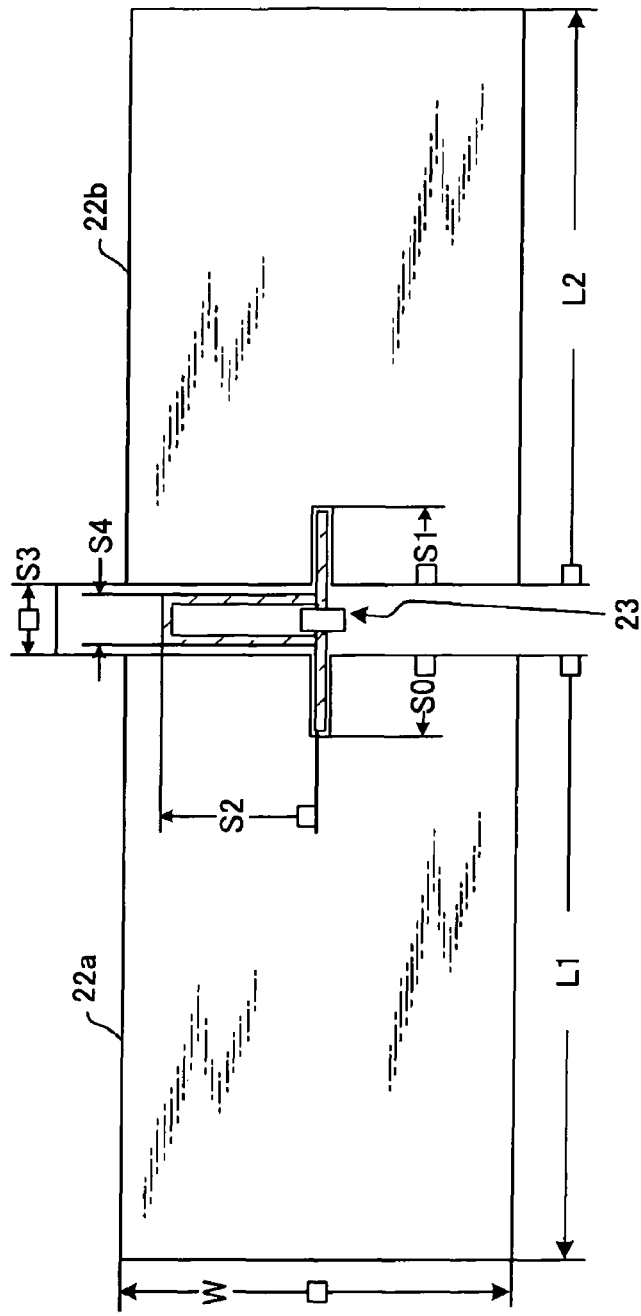
FIG. 10A and FIG. 10B are drawings showing an example of dimensions of a RFID tag of a second embodiment of the invention.

FIGS. 10A and 10B show the actual dimensions of the RFID tag shown in FIG. 9, where the sizes L1 to L2 of the sides of the patch antennas 22a to 22b are 77.5 mm and 74 mm, respectively, and they resonate at or near 910 MHz and 950 MHz, respectively. The board characteristics, or in other words the dielectric characteristics are: specific dielectric constant=4.5, dielectric loss=0.01, and the board thickness is taken to be 2.0 mm.

(b) Characteristics

Various characteristics were simulated for a RFID tag having the dimensions shown in FIG. 10 and the board characteristics described above when the frequency applied to the patch antenna was changed from 800 MHz to 1000 MHz.

Matching Characteristics

FIG. 11A is a Smith chart showing the impedance of a tag antenna, and FIG. 11B is a partial enlarged view. When the frequency is changed from 800 MHz to 1000 MHz, the impedance of the tag antenna changes in a circular pattern as shown by IPT, however, it can be seen that the impedance does not change greatly. This means it is easy to match the impedances of the tag LSI and tag antenna over a wide bandwidth.

Gain Characteristics

FIG. 12 shows the gain of the tag antenna when the frequency is changed from 800 MHz to 1000 MHz, and since the resonant frequencies of the two patch antennas 22a, 22b differ, the gain also has peaks at two frequencies, and it can be seen that the respective peaks are at or near the transmission frequencies for RFID tags that are used in the USA (902 to 928 MHz) and RFID tags used in Japan (952 to 954 MHz).

S11 Characteristics and Communication Distance

As shown in Table 2, the S11 characteristics and communication distance are simulated with the minimum necessary power for operating the tag LSI taken to be −7.00 dBm, the resistance Rcp of the tag LSI taken to be 1400.0Ω, the capacitance Ccp taken to be 0.55 pF, the power supplied to the antenna of the reader/writer taken to be 27.00 dBm, and the reader/writer antenna gain taken to be 9.00 dBi.

TABLE 2

| LSI | MINIMUM NECESSARY POWER | −7.00 dBm |
|---|---|---|
| | Rcp | 1400.00 Ω |
| | Ccp | 0.55 pF |
| RW | POWER | 27.00 dBm |
| | GAIN | 9.00 dBi |

Figure 13:
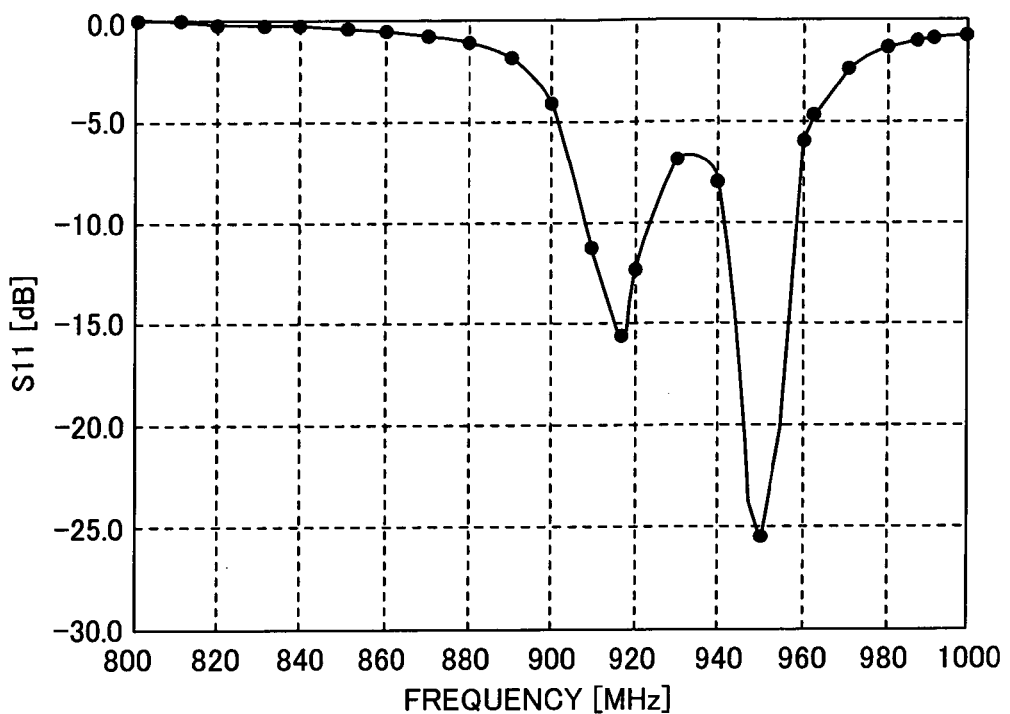
FIG. 13 is a drawing showing the simulation results for the S parameter S11 of a second embodiment of the invention when the frequency is changed from 800 MHz to 1000 MHz.

FIG. 13 shows the simulation results of the S parameter S11 when the frequency is changed from 800 MHz to 1000 MHz. The S parameter S11 expresses the degree of impedance matching between the tag LSI and tag antenna, with the reference impedance being the impedance of the tag LSI and not 50Ω. From FIG. 13, it can be seen that matching is achieved at the transmission frequency bandwidths used for the two RFID tags for Japan and the USA.

Figure 14:
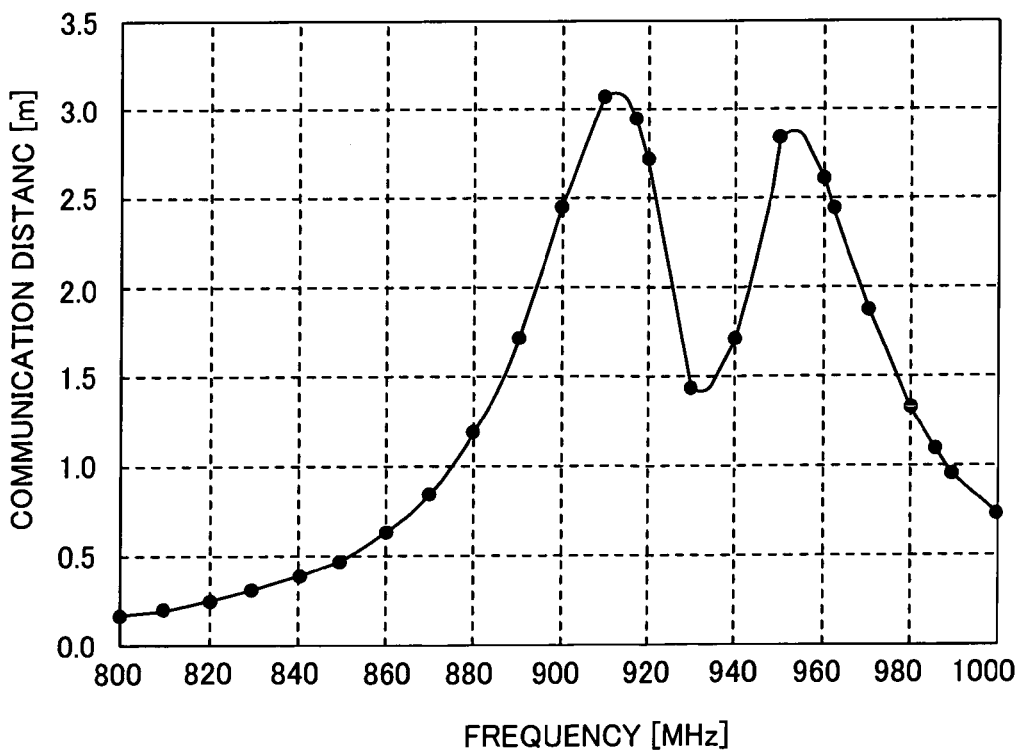
FIG. 14 is a drawing showing the communication distance of a second embodiment of the invention when the frequency is changed from 800 MHz to 1000 MHz.

FIG. 14 shows the communication distance when the frequency is changed from 800 MHz to 1000 MHz for the case in which a linear polarized antenna is used for the antenna of the reader/writer, and from the figure it can be seen that communication distance can be increased in the transmission frequency bandwidths used for the two RFID tags for Japan and the USA. The communication distance r for the RFID tag is calculated according to Equation (1).

(c) Matching Adjustment

There are cases in which impedances of the tag antenna and tag LSI cannot be matched. In such a case, the impedances of the tag antenna and tag LSI can be matched by adjusting the length S2 of the loop pattern (see FIG. 10), or by adjusting the relative position between patch antennas 22a, 22b.

(1) Matching By Adjusting the Loop Pattern Length S2

Figure 15:
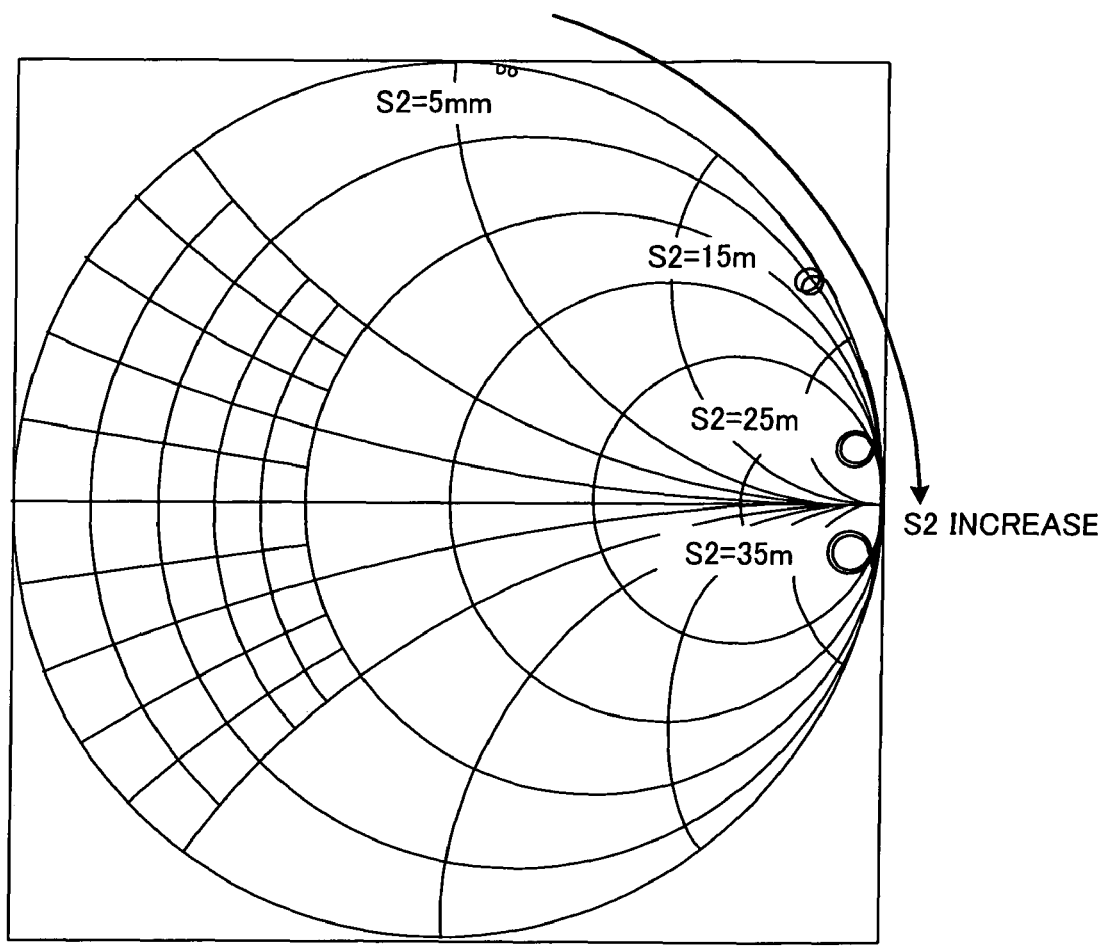
FIG. 15 is a drawing showing the impedance on a Smith chart when the loop pattern length S2 of a second embodiment of the invention is changed, and the frequency for each of the respective loop pattern lengths S2 is changed 800 MHz to 1000 MHz.

FIG. 15 shows the impedance on a Smith chart for the case in which the length of the loop pattern S2 is changed to be 5 mm, 15 mm, 25 mm and 35 mm, and the frequency is changed from 800 MHz to 1000 MHz for each respective loop pattern length. The dimensions other than the loop pattern length S2 are as shown in FIG. 10, and the dielectric characteristics of the board are: specific dielectric constant=4.5, dielectric loss=0.01, and the board thickness is taken to be 2 mm. As the loop pattern length S2 increases, the loop that indicates the change in impedance becomes larger, and as the loop becomes larger the impedance moves in the clockwise direction on the Smith chart. This means that mainly the susceptance of the tag antenna changes.

When considering matching impedances of the tag LSI and tag antenna it is necessary that both the conductance and susceptance be matched as well as possible. This matching is realized best when the conductance of both the tag LSI and tag antenna are equal, in addition the susceptance of both the tag LSI and tag antenna have opposite signs and the absolute values are equal. In this second embodiment, when it is desired to adjust the susceptance of the antenna, it can be seen that changing the length of S2 is an effective method.

Also, in a power-supply pattern that combines a dipole pattern or monopole pattern with the loop as in the first and second embodiments it is also possible to similarly change the antenna susceptance by changing the length of the dipole pattern or monopole pattern. In other words, when the length of a dipole pattern or monopole pattern having a length that is sufficiently shorter than the wavelength is increased, the impedance turns in the clockwise direction on the Smith chart.

(2) Matching By Adjusting the Relative Position Between Patch Antennas

Figure 16A:
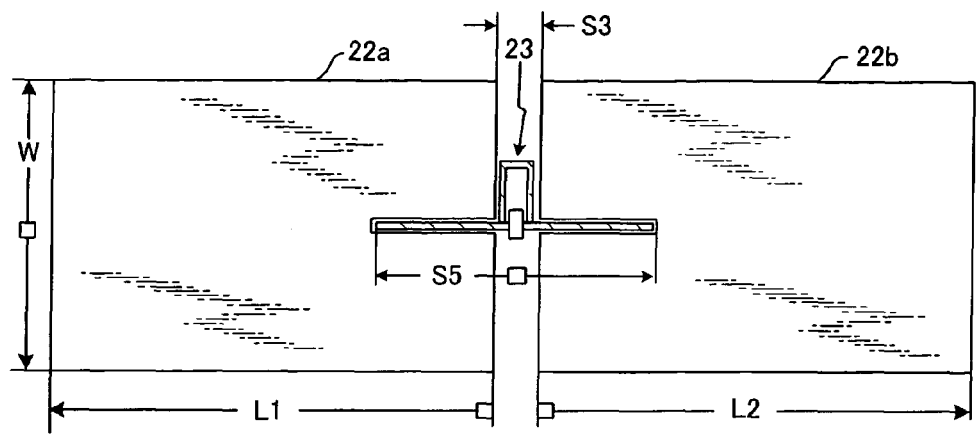
FIG. 16A, FIG. 16B and FIG. 16C are drawings explaining a method of matching impedance by changing the relative position between the patch antenna and the power-supply pattern.
Figure 16B:
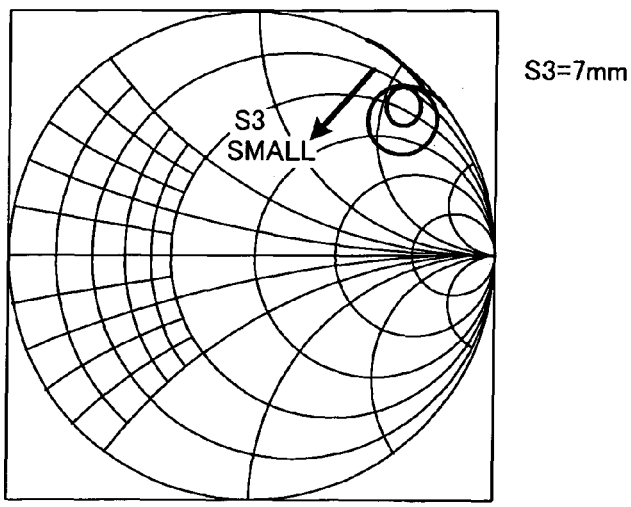
Figure 16C:
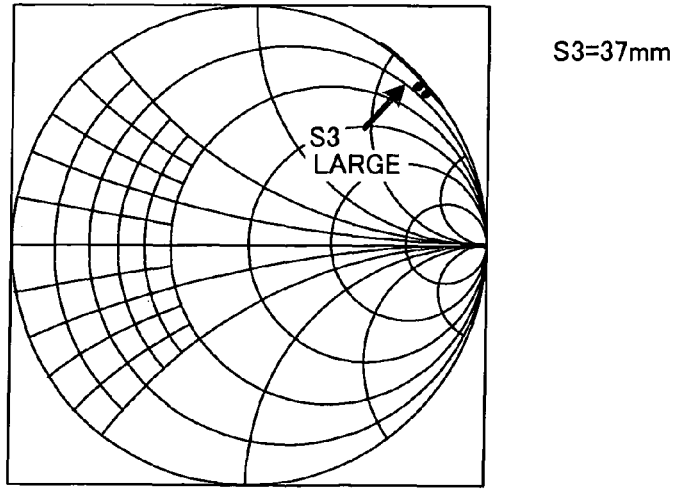

FIGS. 16A to 16C are drawings explaining a method of matching impedance by changing the relative position between the patch antennas 22a, 22b. As shown in FIG. 16A, in the RFID tag of this second embodiment, the change in impedance is simulated by fixing the length of the dipole pattern S5 at 48 mm and changing the distance S3 between patch antennas. Here, L1=77 mm, L2=74.5 mm, W=50 mm, the dielectric thickness is 2.0 mm and the specific dielectric constant is 4.5. FIG. 16B shows change in impedance on a Smith chart in the case where S3=7 mm and the frequency is changed from 800 MHz to 1000 MHz, and FIG. 16C shows change in impedance on a Smith chart in the case where S3=37 mm and the frequency is changed from 800 MHz to 1000 MHz.

As can be seen from the simulation results in FIGS. 16B and 16C, as S3 becomes small, the impedance at or near the resonant frequency (the impedance at the portion of one turn) shifts in the direction toward the center of the Smith chart. This caused mainly by the decrease in conductance of the tag antenna. The optimum matched state occurs when the susceptances of the tag antenna and tag LSI are matched, and in addition the conductance of the tag antenna and tag LSI are equal. When it is desired to optimize the conductance of the tag antenna, changing the positional relationship of the patch antennas is an effective method.

(d) Effect

With this second embodiment, the RFID tag comprises two patch antennas that function as tag antennas and that have different sizes, so it is possible to increase the frequency bandwidth, for example, it is possible to increase the gains at the transmission frequencies used for RFID tags for Japan and the USA, and to provide a RFID tag that can be used in a plurality of regions that use these different transmission frequencies. Also, with this second embodiment, the power-supply pattern section and patch antennas are coupled by high-frequency coupling, so it is not necessary to form holes in the patch antennas in order to supply power, and thus the construction of the power-supply section is simplified.

Also, with this second embodiment, by adjusting the length of the loop pattern or linear antenna pattern, or by adjusting the relative position between these patch antennas, it is possible to adjust the impedance matching between the tag antenna and tag LSI. Therefore, there is no need for an impedance conversion circuit, and it is possible to make the RFID tag smaller and thinner.

(C) Embodiment 3

(a) Construction

Figure 17A:
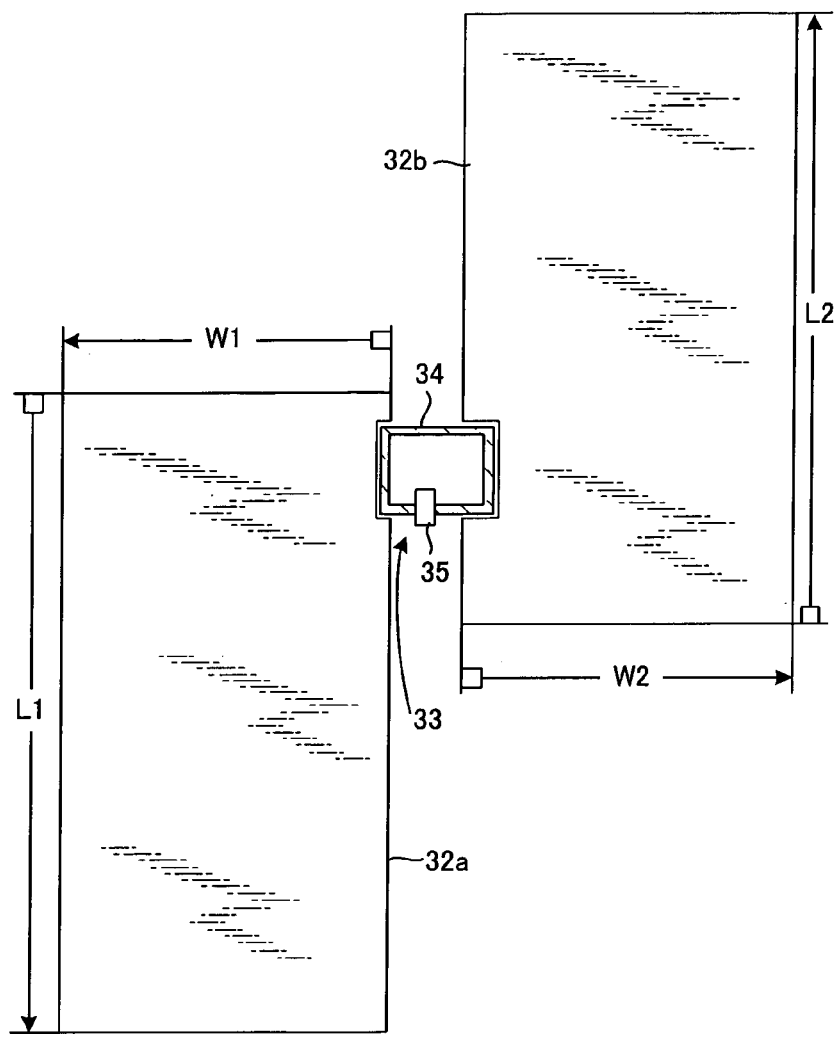
FIG. 17A and FIG. 17B are drawings explaining a RFID tag of a third embodiment of the invention.
Figure 17B:
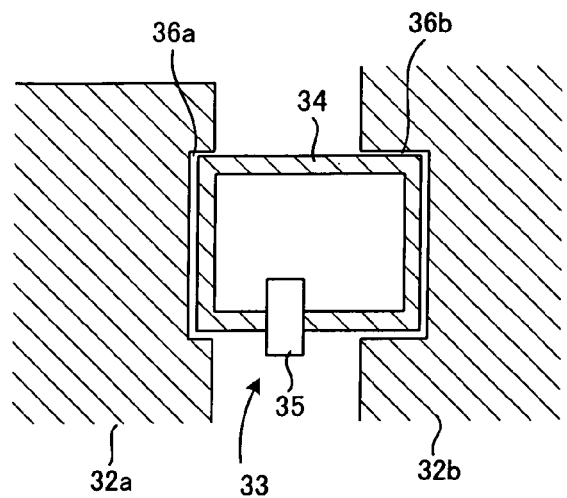

FIGS. 17A and 17B are drawings explaining a RFID tag of a third embodiment of the invention, where FIG. 17A is a top view, and FIG. 17B is an enlarged view of the main parts.

The RFID tag of this third embodiment is made by etching the surface of a double-sided printed circuit board to form two patch antennas 32a to 32b that function as tag antennas, and a power-supply pattern section 34, and by mounting a tag LSI 35 onto the power-supply pattern section 34 by a chip bonding technique. The power-supply pattern section 34 and tag LSI 35 form a power-supply element 33. The electrically conductive pattern (not shown in the figure) on the rear surface of the printed circuit board is used as a ground (all surfaces are metallic).

The sizes L1 to L2 of the patch antennas 32a to 32b are set so that the resonant frequencies correspond with the transmission frequencies used by UHF RFID tags for the USA and Japan. The power-supply pattern section 34 comprises a loop pattern, and that loop pattern is coupled with the patch antennas 32a to 32b by high-frequency coupling, and signals are input to the patch antennas from the tag LSI 35 by way of this high-frequency coupling, or signals that are received by the patch antennas are transferred to the patterns and input to the tag LSI 35. In other words, shallow cutout sections 36a, 36b are formed on the end sections of the patch antennas 32a to 32b, and parts of the loop pattern are placed in the cutout sections, and the loop pattern 34 and the patch antennas 32a to 32b are connected by high frequency by way of the cutout sections, so that the loop pattern supplies power to the patch antennas 32a to 32b by high frequency.

The electrical length of one side of the patch antennas of the RFID tag is $\lambda/2$, and the patch antennas resonate at a specified frequency that corresponds to that size, in other words, when a current J flows back and forth over the surface of the patch antennas, an electromagnetic wave that is polarized in the direction of the Y-axis (horizontal direction) is emitted in the vertical direction (Z-axis direction) to the patch antennas as explained using FIG. 2. When the sizes L1 to L2 are set so that the resonant frequencies of the patch antennas 32a, 32b shown in FIG. 17A and FIG. 17B correspond to the transmission frequencies for UHF RFID tags that are used in Japan and the USA, the gain of the RFID tag increases at those resonant frequencies.

(b) Communication Distance

As shown in Table 3, the communication distance was simulated according to Equation (1) with the minimum necessary power for operating the tag LSI taken to be −7.00 dBm, the resistance Rcp of the tag LSI taken to be 1500.0Ω, the capacitance Ccp taken to be 1.0 pF, the power supplied to the antenna of the reader/writer taken to be 27.00 dBm, and the reader/writer antenna gain taken to be 9.00 dBi.

TABLE 3

| LSI | MINIMUM NECESSARY POWER | −7.00 dBm |
|---|---|---|
|  | Rcp | 1500.00 Ω |
|  | Ccp | 1.00 pF |
| RW | POWER | 27.00 dBm |
|  | GAIN | 9.00 dBi |

Figure 18:
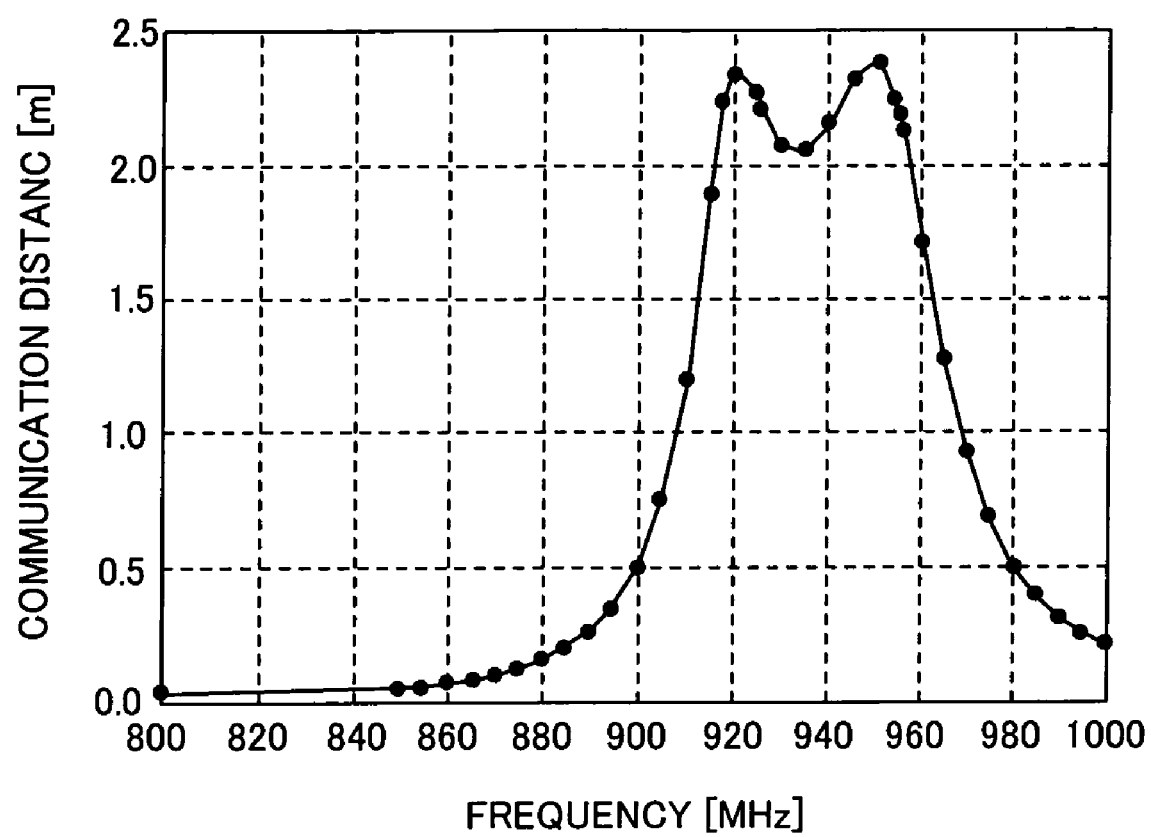
FIG. 18 is a drawing showing the communication distance of a third embodiment of the invention when the frequency is changed from 800 MHz to 1000 MHz.

FIG. 18 shows the communication distance when the frequency is changed from 800 MHz to 1000 MHz for the case in which a linear polarized antenna is used for the antenna of the reader/writer, and from the figure it can be seen that the communication distance can be increased in two transmission frequency bandwidths used for the RFID tags for Japan and the USA. Here the sizes L1 to L2 of the sides of the patch antennas 32a to 32b are 77.5 mm and 74 mm, respectively, and they resonate at or near the frequencies of 920 MHz and 950 MHz, respectively. Also, the dielectric characteristics of the board are: specific dielectric constant=4.5, dielectric loss=0.01, and the board thickness is taken to be 2 mm.

(c) Effect

With this third embodiment, the RFID tag comprises two patch antennas that function as tag antennas and that have different sizes, so it is possible to increase the frequency bandwidth, and it is possible to increase the gains at the transmission frequencies used for RFID tags for Japan and the USA, and to provide a RFID tag that can be used in a plurality of regions that use these different transmission frequencies. Also, with this third embodiment, the power-supply pattern section and patch antennas are coupled by high-frequency coupling, so it is not necessary to form holes in the patch antennas in order to supply power, and thus the construction of the power-supply section is simplified.

Also, as in the case of the second embodiment, with this third embodiment, by adjusting the length of the loop pattern or by adjusting the relative position between these patch antennas, it is possible to adjust the impedance matching between the tag antenna and tag LSI. Therefore, there is no need for an impedance conversion circuit, and it is possible to make the RFID tag smaller and thinner.

(D) Size Reduction of the Patch Antennas

Referring to FIG. 2, by making the electrical length of one side of the patch antenna 12 a half wavelength (=$\lambda/2$), it is possible to have the patch antenna resonate at a frequency that corresponds to the wavelength $\lambda$.

Figure 19A:
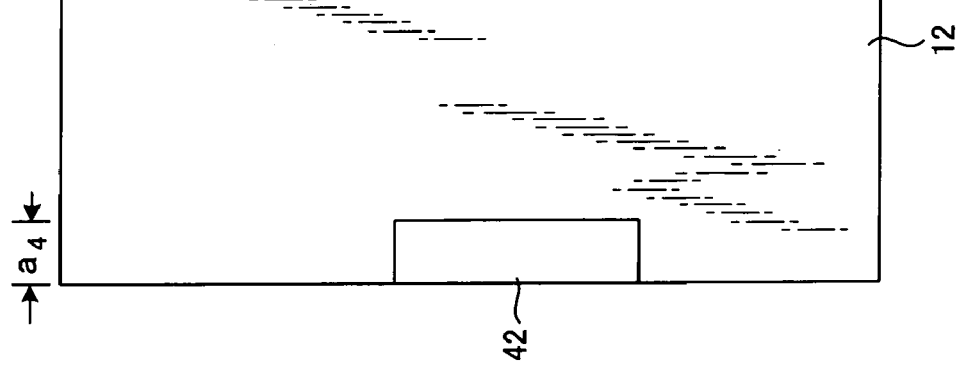
FIG. 19A and FIG. 19B are drawings explaining construction for making the size of the patch antenna more compact.
Figure 19B:
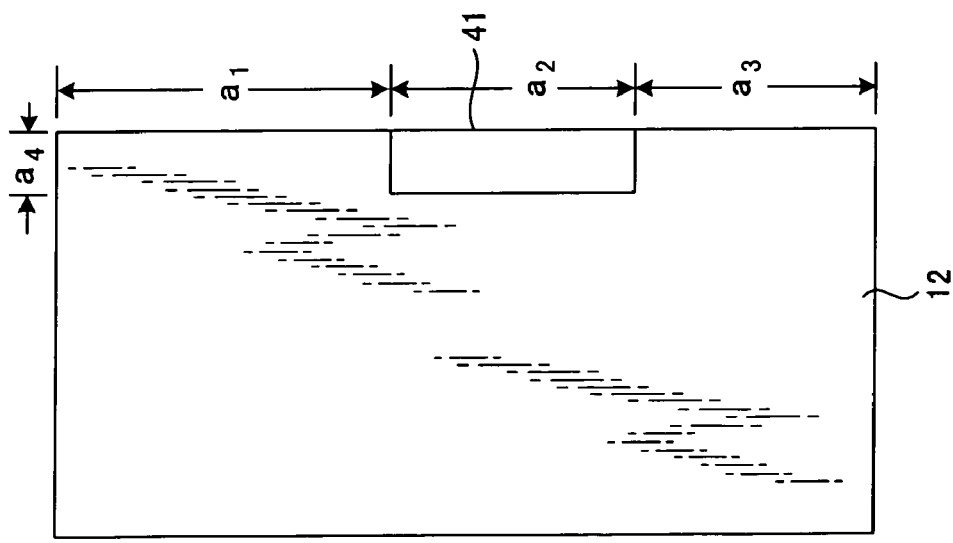

Also, even though cutout sections 41, 42 are formed in the end section on one side or in the end sections on both sides of the patch antenna as shown in FIGS. 19A and 19B to form a C-shaped or H-shaped patch so that the electrical length (a1+a2+a3+2×a4) is equal to $\lambda/2$, it is possible to make the patch antenna resonate at a frequency that corresponds to the wavelength $\lambda$. Therefore, in order to reduce the size of the patch antenna, a C-shaped or H-shaped patch antenna is used.

(E) Construction Capable of Receiving and Emitting Circular Polarized Waves

As shown in FIG. 2, the tag antenna of the first thru third embodiments emits an electromagnetic wave that is linearly polarized in the Y-axis direction in the vertical direction onto the horizontal plane (patch antenna surface), and naturally, can receive with good efficiency electromagnetic waves that are linearly polarized in the Y-axis direction and that are incided in the vertical direction of the patch antenna surface. However, the tag antenna cannot receive emitted electromagnetic waves that are linearly polarized in the X-axis direction. Therefore, it is necessary to construct a patch antenna such that circular polarized electromagnetic waves are emitted, and so that electromagnetic waves that are linearly polarized in any direction can be received.

Figure 20A:
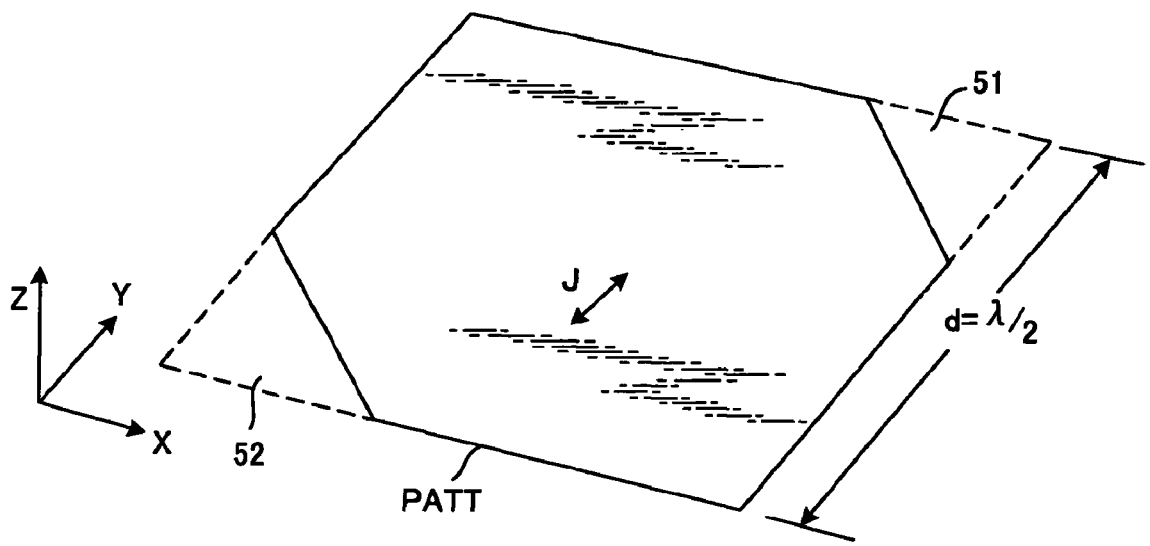
FIG. 20A and FIG. 20B are drawings showing an example of the construction of a patch antenna that is capable of emitting and receiving circular polarized radio waves.
Figure 20B:
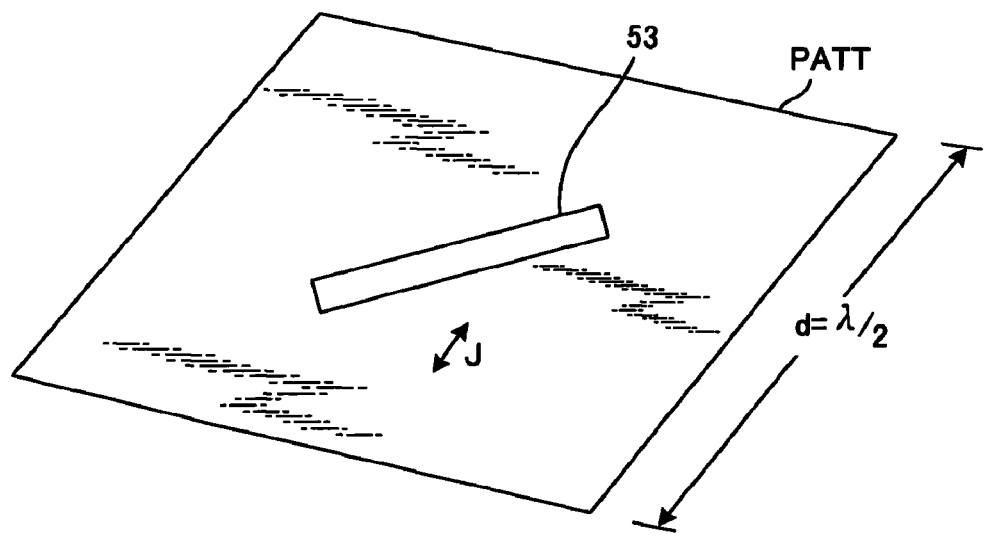
Figure 21:
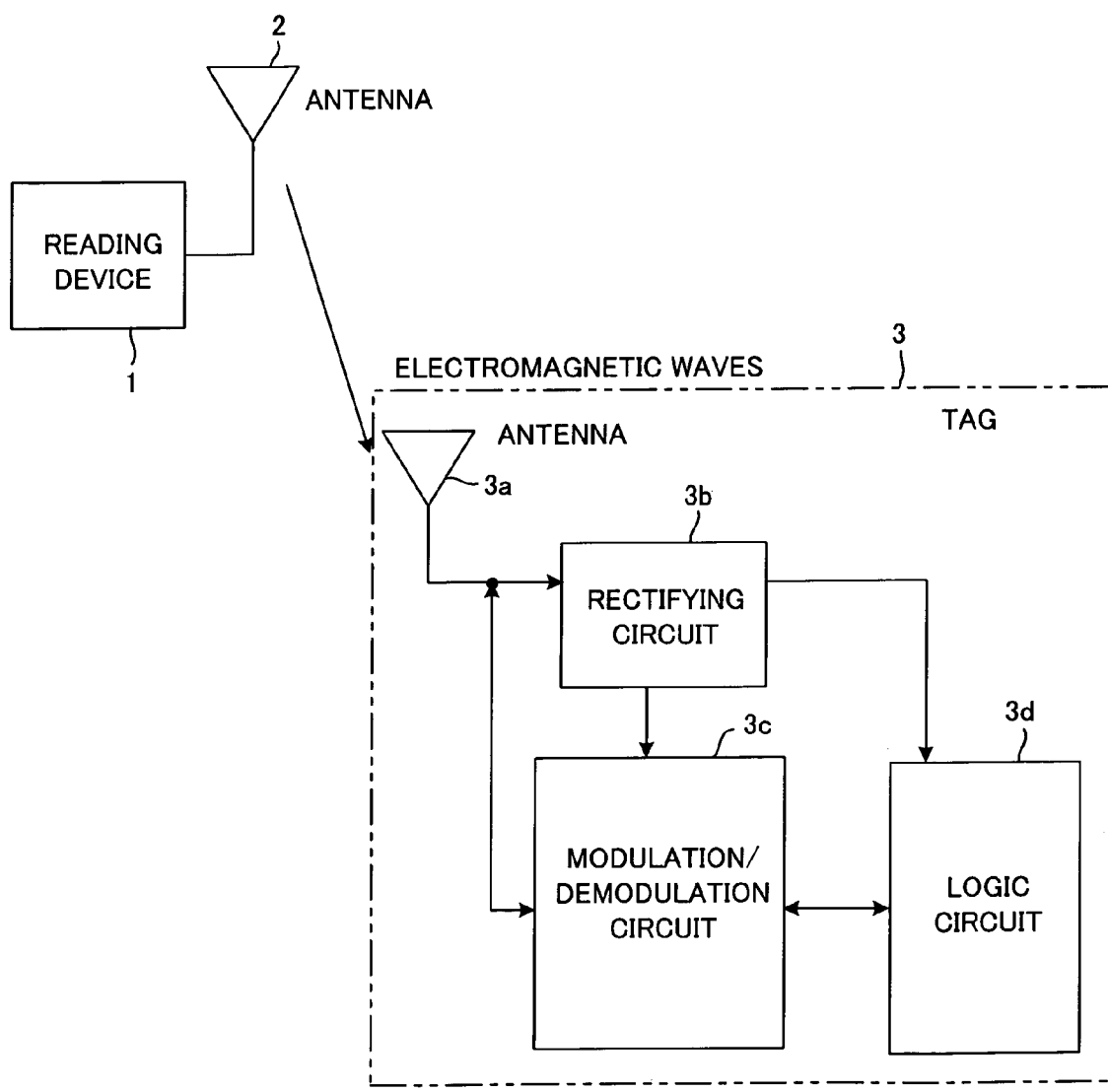
FIG. 21 is a drawing explaining a RFID tag.
Figure 22A:
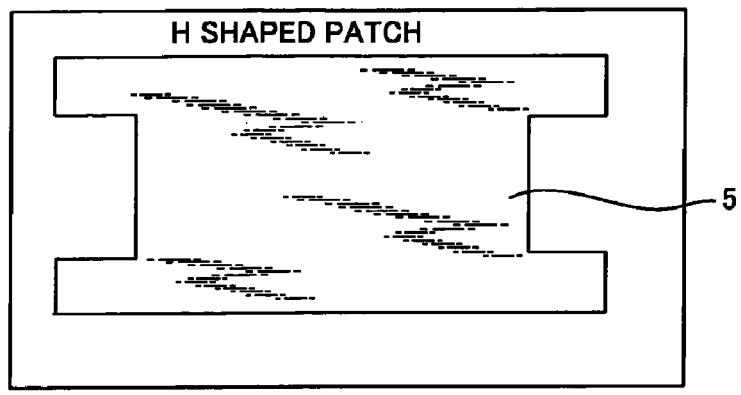
FIG. 22 is drawing explaining an example of a prior multiband RFID tag that can be used in a plurality of frequencies.
Figure 22B:
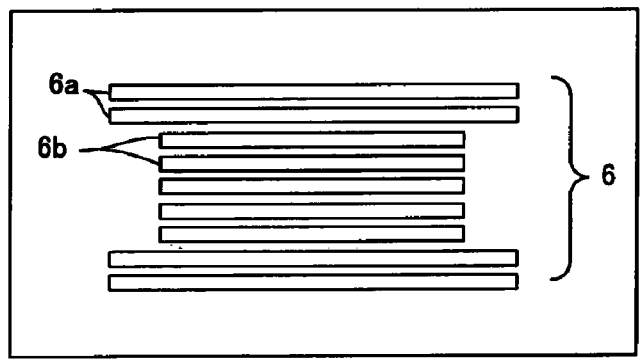
Figure 22C:
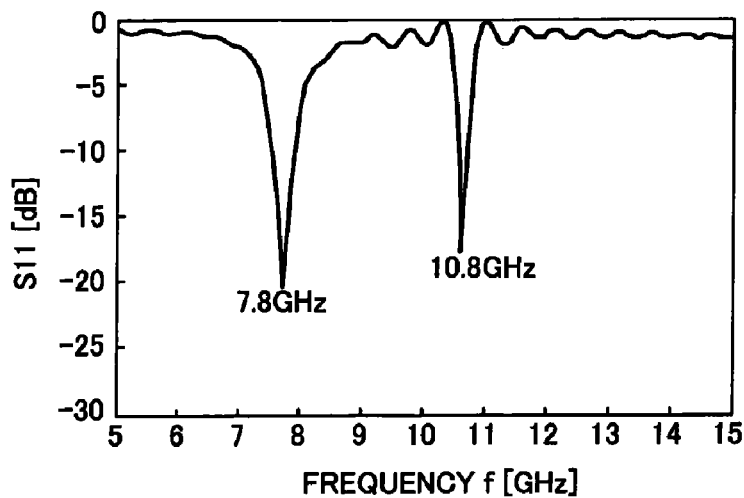

FIGS. 20A and 20B show an example of construction of a patch antenna that is capable of emitting or receiving circular polarized electromagnetic waves. FIG. 20A shows an example of cutting the corner sections 51, 52 of the patch antenna PATT diagonally to the direction that the current J flows back and forth, and FIG. 20B shows an example of forming a slot 53 in the patch antenna PATT diagonally to the direction that the current J flows back and forth.

As many apparently widely different embodiments of the present invention can be made without departing from the spirit and scope thereof, it is to be understood that the invention is not limited to the specific embodiments thereof except as defined in the appended claims.

What is claimed is:

1. A RFID tag that has a tag antenna and a tag LSI circuit, comprising:
   a power-supply element in which the tag LSI circuit is mounted on a power-supply pattern section;
   a plurality of patch antennas which function as tag antennas and of which sizes differ from each other; and
   a high-frequency coupling section that couples the power supply pattern section of said power-supply element with each of said patch antennas by high-frequency coupling, wherein
   said power-supply pattern section comprises a loop pattern;
   said high-frequency coupling section has shallow cutout sections formed on the end section of the patch antennas; and
   parts of said loop pattern are placed in the cutout sections of the patch antennas respectively, thereby, the loop pattern and the patch antennas are connected by high frequency by way of the cutout sections.

2. A RFD tag that has a tag antenna and a tag LSI circuit, comprising:
- a power-supply element which the tag LSI circuit is mounted on a power-supple pattern section;
- a plurality of patch antennas which function as tag antennas and of which sizes differ from each other; and
- a high-frequency coupling section that couples the power-supply pattern section of said power-supply element with each of said patch antennas by high-frequency coupling, wherein
- said power-supply pattern section comprises linear antenna patterns on both sides of the tag LSI circuit; and
- said high-frequency coupling section couples each of the linear antenna patterns with each of said patch antennas by high-frequency coupling, wherein said high-frequency coupling section has cutout sections formed on the center of the end sections of the patch antennas, and the linear antenna patterns are located inside the cutout sections respectively, thereby the linear antenna patterns and the patch antennas are connected by high-frequency by way of the cutout sections.

3. A RFID tag that has a tag antenna and a tag LSI circuit, comprising:
- a power-supply element in which the tag LSI circuit is mounted on a power-supply pattern section;
- a plurality of patch antennas which function as tag antennas and of which sizes differ from each other; and
- a high-frequency coupling section that couples the power-supply pattern section of said power-supply element with each of said patch antennas by high-frequency coupling, wherein
- said power-supply pattern section comprises a pattern that is a combination of a loop pattern and linear antenna pattern; and
- said high-frequency coupling section couples the loop pattern or linear antenna pattern with each of said patch antennas by high-frequency coupling.

* * * * *